United States Patent [19]

Enzmann et al.

[11] 4,168,756
[45] Sep. 25, 1979

[54] ELECTROMAGNETICALLY COMPENSATED SCALE

[75] Inventors: Erwin Enzmann, Messtetten; Manfred Kammerer; Johann Tikart, both of Ebingen; Walter Glaser, Burladingen, all of Fed. Rep. of Germany

[73] Assignee: August Sauter GmbH, Ebingen, Fed. Rep. of Germany

[21] Appl. No.: 862,158

[22] Filed: Dec. 19, 1977

[30] Foreign Application Priority Data

Dec. 18, 1976 [DE] Fed. Rep. of Germany ....... 2657462
Oct. 5, 1977 [DE] Fed. Rep. of Germany ....... 2744849

[51] Int. Cl.² .............................................. G01G 7/02
[52] U.S. Cl. ...................... 177/210 EM; 177/DIG. 5; 335/217; 335/236
[58] Field of Search ................ 177/210 EM, 212, 185, 177/DIG. 5; 335/236, 237, 217; 179/115.5 SF, 115.5 R; 361/140; 324/151 A, 105

[56] References Cited

U.S. PATENT DOCUMENTS

| 1,632,609 | 6/1927 | Lee | 335/217 |
| 2,110,680 | 3/1938 | Rowell | 324/151 A |
| 2,513,900 | 7/1950 | Thomander | 335/237 X |
| 3,084,753 | 4/1963 | Hendon | 177/210 |
| 3,325,757 | 6/1967 | Gang | 335/217 |
| 3,688,854 | 9/1972 | Strobel | 177/210 EM |
| 4,091,886 | 5/1978 | Knothe | 177/210 EM |

*Primary Examiner*—Joseph W. Hartary
*Attorney, Agent, or Firm*—Ernest F. Marmorek

[57] ABSTRACT

A balancing scale or electromagnetically compensated weighing apparatus has an independently actuatable and temperature-sensitive magnetic device for balancing a load member; the magnetic device forms a magnetic circuit, and includes a temperature-sensitive corrective device affecting the circuit in at least two locations, so as to substantially temperature-compensate the magnetic circuit over a predetermined temperature range.

5 Claims, 8 Drawing Figures

ELECTROMAGNETICALLY COMPENSATED SCALE

BACKGROUND OF THE INVENTION

Electromagnetic balancing forces are well known in the construction of balancing scales. Here the force effect of a conductor, through which an electric current passes, and which is disposed in the magnetic field of a magnet, is used to balance a load, the magnet being as a rule a permanent magnet. As an increasing accuracy is desired, however, the use of permanent magnets poses problems. One of the main problems is the fact that the magnetic flux of a permanent magnet, in addition to being dependent upon other influences, is also temperature-dependent.

Magnetic or magnetizable material for permanent magnets available today, have a reversible temperature coefficient of residual magnetism of the order of $-0.2\%$ per degree C. The magnetic flux of a permanent magnet, and consequently the magnetic induction present in an air gap of a magnetic system, of which the permanent magnet is part, and which serves as the balancing system of the scale, thus are reduced in magnitude by two parts in 10,000,/degree C. of temperature increase. Consequently, the generated balancing or measuring force, and hence the indication of the scale is therefore erroneous, and provides an erroneous reading.

For example, a scale having 10,000 digits would indicate, when fully loaded, an error, and consequently, an error in the indication of the scale of two digits per degree of temperature increase in the event of any temperature fluctuation. But, as the electric circuit of a scale, on one hand, and the balancing coil on the other hand, as a result of a current passing therethrough, generates heat, a temperature gradient or field surrounding the magnetic system comes into existence. This results in a superposition of the generally homogeneous temperature region of the surrounding temperature, and a relatively strong non-homogeneous temperature field caused by the heat generated by the system itself. Both the temperature fields or regions superimposed on one another can be subjected to fluctuation in dependence of time. Thus, the surrounding or ambient temperature may fluctuate as a result of cooling or heating, as well as the heat generated by the balancing system itself, as a result of any changes in the load, supply fluctuations and the like. In particular, the non-homogeneous temperature field or region, due to heat generated by the system itself, is built up following activation of the balancing scale itself.

All known temperature compensation systems have the disadvantage, however, that they operate with acceptable accuracy only in the presence of homogeneous temperature fields or regions. If the temperature field or region is changed as a function of time, or due to any homogeneous local distribution of the temperature, large deviations arise, as the magnetic materials causing these errors have different temperatures than the compensating materials and/or the temperature sensing means used.

SUMMARY OF THE INVENTION

If a substantially error-free indication is desired covering a large temperature region, then an effective temperature compensation system must be provided.

It is therefore one of the principle objects of the present invention to devise a system for compensation of the influence of any temperature fluctuations on the magnetic system in such a manner, that even in the event of a non-homogeneous temperature distribution in a large temperature region, there do not occur any errors or erroneous readings of the measurement results.

This object is attained, according to the invention, by using a balancing scale having independently actuatable and temperature-sensitive magnetic means for balancing a load; the magnetic means forming a magnetic circuit and including temperature-sensitive corrective means affect the circuit in at least two locations, so as to substantially temperature-compensate the magnetic circuit over a predetermined temperature range.

It is advantageous if the magnetic means has a reluctance changing in response to a predetermined temperature change by a first predetermined magnitude, and if the corrective means has a reluctance varying in response to the predetermined temperature range by a second predetermined magnitude, so as substantially to temperature-compensate the magnetic circuit; the corrective means include at least two correcting members in the magnetic circuit.

At least one of the correcting members is preferably composed of material having a magnetic reluctance increasing with increasing temperature.

In an advantageous embodiment, the magnetic means includes a permanent magnet which has a bore; one correcting member then has an effective portion at least partially disposed in the bore, and the other correcting member is then disposed near the exterior of the permanent magnet.

In an advantageous embodiment, the permanent magnet has a substantially cylindrical shape.

It is advantageous if the other correcting member includes two partially correcting elements spaced apart from one another to define a gap therebetween, the spacing between the partially correcting elements being adjustable so as to adjust the magnetic reluctance of the other correcting member.

The other correcting member may advantageously be a magnetic shunt having the shape of a sheath.

It is advantageous if the sheath encloses the permanent magnet at least partially.

It is also advantageous if the one correcting member includes first and second portions, the portions being spaced from one another to define an air gap therebetween, and wherein the spacing between the portions is adjustable, so as to adjust the reluctance of the one correcting member.

One of the portions is advantageously cone-shaped, and the other of the portions is advantageously formed as a recess substantially matching the shape of the cone-shaped portion. The permanent magnet may include a plurality of magnet parts, at least some of the magnet parts being adjacent other of the magnet parts, and wherein the corresponding correcting member is disposed between two adjacent magnet parts.

It is advantageous if the magnetic means defines an air gap, and further includes a primary coil disposed in the air gap, so that a magnetic flux of a magnetic circuit passes through the air gap. The primary coil then controls operatively the magnetic flux at least partially, and magnetic shunt means are advantageously disposed adjacent the air gap for adjusting the magnetic flux. A portion of the magnetic flux then passes through the magnetic shunt means, and bypasses the primary coil.

It is also advantageous if at least one of the correcting members is a resistor, which has a negative temperature coefficient for sensing the temperature of the magnetic means, and if control means are provided for operatively controlling the primary coil; the control means are at least partially controllable by a resistor, so as to substantially temperature-compensate the magnetic circuit.

At least one of the correcting members may be a secondary coil, and the secondary coil may include a copper winding for sensing the temperature of the magnetic means. Control means may then be additionally provided for controlling the primary coil, the control means being at least partially controllable by the secondary coil, so as to substantially temperature-compensate the magnetic circuit.

It is advantageous if the magnetic shunt means is rigidly secured to the magnetic means.

The magnetic shunt means may also be disposed at a variable distance from the magnetic means; it is then particularly advantageous if bimetallic sensing means having a shape controllable as a function of temperature are provided. The temperature-sensitive means then has a first end, which is rigidly secured to the magnetic means, and a second free end; the position of the second free end with respect to the magnetic means is then controllable by the bimetallic temperature-sensitive means, and the shunt means are then disposed at the second free end of the bimetallic temperature-sensitive means, so as to automatically temperature-compensate the magnetic means.

The flux may include a main flux at a predetermined direction, and there may also be provided adjustable threading means having an end facing the air gap which may be inserted into the magnetic means, and moved at substantially right angles to the predetermined direction; the magnetic shunt means are then advantageously disposed at the end facing the air gap, so that the magnetic circuit may be adjusted by the threaded means.

It is advantageous if the correcting members are composed of materials having respective reluctances of differing temperature dependence.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
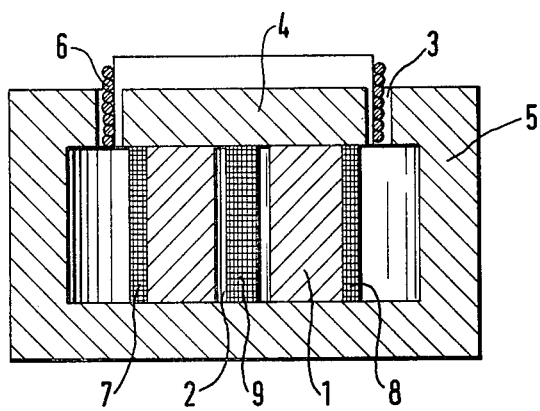
FIG. 1 shows a section through a pot-shaped magnet.

In carrying the invention into effect, in FIG. 1, there is shown a pot-shaped magnet including a cylindrical permanent magnet 1 having an inner bore 2. The permanent magnet 1 is embedded in a pot, in which there is formed an air gap 3, between a pole plate 4, and a cylindrical pot 5. Within the air gap 3, there is disposed a coil 6 guidable on a non-illustrated guidance system, so that the coil 6 may be moved in a vertical direction.

The permanent magnet 1 includes a magnetic shunt sheath 7 made of a material whose induction properties are temperature-dependent. This material may, for example, include a 30% nickel-iron alloy, which has a temperature induction curve which decreases in a straight-line fashion as a function of temperature over a relatively large temperature region. The magnetic or magnetizable material of the auxiliary shunt sheath 7 therefore has a negative temperature coefficient. Thus, the magnetic flux passing through the shunt sheath decreases as the temperature increases. The shunt sheath therefore reduces the main flux of the permanent magnet 1 through the air gap 3, at a low temperature. If, however, the temperature increases, and the main flux of the permanent magnet 1 decreases through the air gap 3, then simultaneously the magnetic reluctance of the magnetic shunt sheath 7 increases as a result of the negative temperature coefficient of its magnetic or magnetizable material, so that the effective flux of the permanent magnet 1 passing through the air gap 3 is kept constant.

The magnetic shunt sheath 7 may be a closed cylindrical sheath enclosing the cylindrical permanent magnet 1. Alternatively, the magnetic shunt sheath 7 may also consist of individual rods or strips 8, which extend in a longitudinal direction along the cylindrical circumference of the permanent magnet 1, between the pole plate 4, and the bottom of the pot 5. There is also disposed a magnetic shunt rod within the bore 2 of the permanent magnet 1, extending between the pole plate 4 and the bottom of the pot 5, along the axis of the cylindrical arrangement. The diameter of the magnetic shunt rod 9 is smaller than the diameter of the inner bore 2.

By appropriate dimensioning of the auxiliary shunt sheath 7, the strips 8, or the auxiliary magnetic shunt rod 9, and a corresponding selection of magnetic or magnetizable material, it is possible to obtain a very good compensation of the main-or effective flux of the permanent magnet 1 through the air gap 3 and the coil 6, so as to maintain the flux constant within a relatively large temperature range, for example, from 10° C. to 50° C. As a result of the negative temperature coefficient of the magnetic or magnetizable material of the magnetic shunt sheath 7, the strips 8, or the magnetic shunt rod 9, the effectiveness of the magnetic shunt decreases with increasing temperature, and decreasing effectiveness of the main magnetic circuit, while, when the temperature is falling, and the effectiveness of the main magnetic circuit increases, the magnetic shunt becomes more effective. Thus, the magnetic induction within the air gap 3 remains unaffected by any change in temperature. This is due to the compensating action of the different shunt paths.

Figure 2:
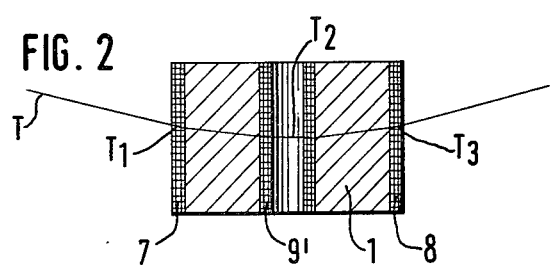
FIG. 2 shows a modified version of the magnet including a temperature graph.

FIG. 2 shows a version slightly different from that of FIG. 1, in which the magnetic shunt rod 9 of FIG. 1 has been replaced by a magnetic shunt cylinder 9', which is disposed coaxially with the cylindrical permanent magnet 1.

FIG. 2 shows additionally a temperature curve T, which indicates a radial temperature distribution in the cylindrical arrangement shown. In the case illustrated, the permanent magnet 1 is, on its outer left side, at a temperature $T_1$, at a temperature $T_2$ in the region of its longitudinal axis, and is, outwardly on its right side, at a temperature $T_3$. These temperatures then are also the temperatures of the corresponding magnetic shunts. It will be obvious that in view of the fact that the temperature $T_2$ is lower than the temperatures $T_2$ and $T_3$, that the compensating action of the magnetic shunt cylinder 9' is also smaller than the compensating action of the magnetic shunt path on the periphery of the cylindrical permanent magnet 1. This does, indeed, correspond to the requirement that within the region of the higher temperature, a stronger compensation is required in view of a larger flux error occurring therein, than in the region of the lower temperature. By distributing the compensation to several magnetic shunts, each magnetic shunt being made of magnetic or magnetizable material having a negative temperature coefficient, one therefore obtains direct compensation of the errors where they actually arise. The effect of the temperature fields ($T_1$, $T_2$ and $T_3$) influencing the main magnetic circuit, and the total effect of all magnetic shunts therefore cancel one another. The magnetic reduction in the air gap 3 remains therefore practically constant.

The accuracy and/or precision of thermal compensation of the magnetic system in the event of a non-linear temperature-dependent field, is improved by a plurality of magnetic shunts and their arrangement in as dense a formation as possible, so that the compensation on as many locations of the permanent manget as possible can be made independent of one another.

Figure 3:
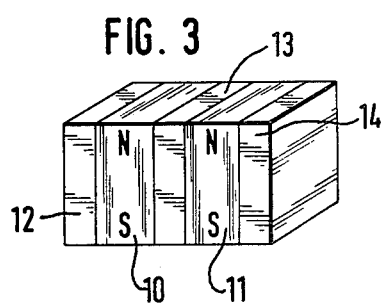
FIG. 3 is a perspective view of a permanent magnet constructed in a sandwich-like manner.

FIG. 3 shows a permanent magnet constructed in a sandwich-like manner of disc-shaped magnet parts 10 and 11. On the left outer exterior side of the magnet part 10, there is disposed a magnetic shunt plate 12. A magnetic shunt plate 13 is disposed between the magnet parts 10 and 11. Outwardly to the right of, and adjacent the partial magnet 11, there is disposed a magnetic shunt plate 14. In the event of an uneven temperature distribution in the permanent magnet 1, as happens frequently during operation in practice, the compensating effect of the magnetic shunts increases the more magnetic auxiliary shunts are distributed over the magnetic or magnetizable material of the permanent magnet 1.

In view of the stray leakage of the material, and dimensional tolerances, the total compensation being the sum of the individual compensations, and also subjected to certain spreads, it is advisable to arrange on one location of the magnetic system for an individual adjustable compensation. By this means, it is possible to preset independently of the temperature curve of the compensation, the extent of the compensation to the desired value.

Figure 4:
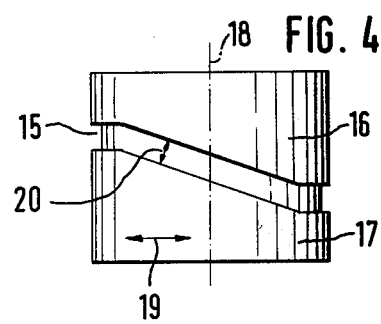
FIG. 4 shows an elevational view of a cylindrical permanent magnet having a sub-divided, magnetic shunt sheath as a correction member.

FIG. 4 shows a permanent cylindrical magnet incorporating the basic principles according to FIGS. 1 or 2. The magnetic shunt sheath is, however, formed with a gap 15, which is formed, according to FIG. 4, between two partial sheaths 16 and 17. The partial sheath 16 is rigidly connected to the permanent magnet 1. The partial sheath 17 is, however, rotatably disposed around the cylinder axis 18. It may therefore be rotated, as shown by the arrow 19, in either a clockwise or counter-clockwise direction.

Rotation in a counter-clockwise direction increases the width 20 of the gap 15, while that width is decreased, when turning in a clockwise direction. By this means, the compensation can be present independent of the compensation temperature curve.

Figure 5:
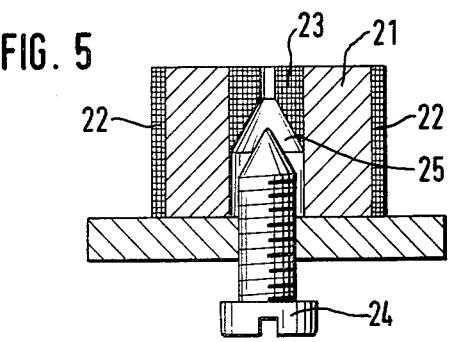
FIG. 5 shows a section through an additional embodiment of a magnet having a correction member.

FIG. 5 shows an alternative embodiment. A permanent magnet 21 includes a magnetic shunt strip 22 disposed on the exterior thereof, serving as part of the desired compensation. In an inner bore of a permanent magnet 21, there is disposed a magnetic shunt cylinder 23, which has a substantially conical-shaped opening 23 facing the bottom thereof. A screw 24 engages the inner bore of the permanent magnet 21 from below. The top of the screw 24 is shaped in a tapered manner so as to match the conical-like opening of the magnetic shunt hollow cylinder 23. The level or height of the screw 24 is adjustable by rotation thereof. By turning in a clockwise sense, the distance 25 to the auxiliary magnetic shunt cylinder 23 can be reduced, and the distance can be increased by turning the screw 24 in a counterclockwise manner. The effect of the magnetic shunt is altered in a corresponding manner.

In all examples described hitherto, temperature compensation of the main magnetic circuit by the coil 6 has been obtained by shunts having a magnetic reluctance increasing with temperature. Compensation on several or all compensation locations can, however, be also achieved by other means. This can be achieved, for example, by temperature indicators, such as copper windings or negative temperature compensation-resistors having a negative temperature coefficient. Both change their electric resistance in dependence of the temperature.

This modification can be employed so as to influence the electronics obtaining the measured value on the balancing scale, in the sense of the desired compensation. Temperature indicators of this type are disposed as closely as possible adjacent the permanent magnet. For example, copper windings are disposed on the permanent magnet, and result, due to their flat distribution, in an integrated temperature indication. Negative temperature compensation resistors referred to as NTC resistors, are suitable for point-measurements of temperature, and particularly for obtaining a special distribution of temperature on different materials of the magnetic system, these resistors being disposed in appropriate recesses or bores. All of these temperature indicators influence the evaluation of the current passing through the coil 6 in dependence of the magnitude of the signals of the individual temperature indicators. Alternately, it is also possible to influence a coil additionally disposed in the magnetic strip by the temperature indicators, whose field is superimposed with the permanent-or main flux of the permanent magnet. With proper dimensioning, it is also possible to render the induction in the air gap 3 independent of any temperature fluctuation.

It is particularly advantageous if the several techniques are combined, for example, by using on the exterior of the permanent magnet 1, a magnetic shunt sheath 7, while in the inner bore 2 of the permanent magnet 1, the compensation is obtained by a temperature indicator, for example, an NTC resistor.

In the implementation versions described above, compensation is effected by corrective members, which are disposed between the pole plate 4, and the bottom of the pot 5, on the permanent magnet 1. The idea of a magnetic shunt may, however, be applied particularly advantageously within the region of the air gap 3 for temperature compensation, in which air gap there is disposed a coil 6.

Figure 6:
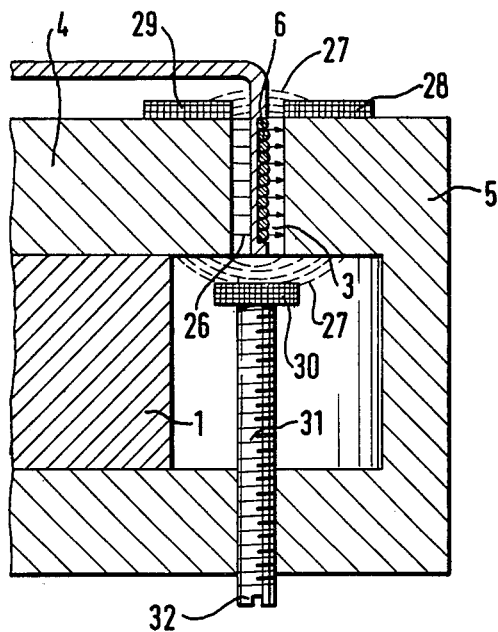
FIGS. 6 and 7 are sections through one-half of the pot-shaped magnet system having at least partially adjustable magnetic shunt plates within the region of the air gap of the magnet system.

FIG. 6 shows one-half of a magnetic system of an electro-magnetic compensating scale, which is implemented as a pot-shaped magnetic system. The permanent magnet 1 is disposed between a pole plate 4 and the bottom of the pot 5 of the magnetic system. In the air gap 3, formed between the pole plate 4 and the pot 5 (cf. FIG. 6) there is disposed a coil 6, which is so arranged on a parallel guidance shown only schematically, so that it is only movable in a vertical direction. The coil 6 is therefore disposed within the main flux 26, which is in turn formed within the air gap 3 between the lateral end of the pole plate 4, and the peripheral rim of the cylindrical pot 5. Laterally of the air gap 3, there is formed above and below the air gap an auxiliary flux 27, which is shaped not only in dependence of the main flux, but is also influenced by the magnetic shunts 28, 29, and 30. These magnetic shunts have each the shape of annular segments. The shunts are, in turn, composed of magnetic or magnetizable materials having a negative temperature coefficient. The auxiliary magnetic shunt plate 28 is disposed above the air gap 3 on the upper side of the pot 5. The magnetic shunt plate 29 is disposed above the air gap 3 on the pole plate 4. The magnetic shunt plates 28 and 29 are so formed that their edges coincide with the rims of the pole plate 4 and the pot 5, respectively, which define the air gap 3. The magnetic shunt plate 30 is disposed on a threaded shaft 31, so as to be able to cover or close the air gap 3. A head 32 of the threaded shaft 31 is disposed external to the pot 5, and may be actuated, for example, by means of a screwdriver. By this means, the magnetic shunt plate 30 may be removed further from the air gap 3 by a counterclockwise motion, or made to close in on the air gap 3 by a clockwise motion.

The effect is as follows: when the magnet system is being warmed, the main flux 26 has a tendency to decrease. At the same time, the magnetic conductivity of the magnetic shunt plates 28, 29, and 30, also decreases as a function of increasing temperature. This in turn means that the resultant auxiliary flux 27, due to these shunt plates and the stray leakages, increases, upon heating of the magnetic system in favor of the main flux 26, which therefore remains largely constant over a wide temperature region, for example, from 10° C. to about 50° C.

The effect of this temperature compensation can be changed by adjusting the distance of the magnetic shunt plate 30 from the air gap 3 by presetting that distance. If the distance between the magnetic shunt plate 30, and the air gap 3 formed between the pole plate 4, and the pot 5 is large, then the temperature compensation by the magnetic shunt plate 30 is correspondingly small. If that distance is small, then the stray flux 27 passing through the magnetic shunt plate 30 is correspondingly large, so that the temperature-dependent change of the stray or auxiliary flux 27 is also increased, making in turn possible a correspondingly large compensation of the temperature dependence of the main flux 26. By regulating the distance or spacing of the magnetic shunt plate 30 from the air gap, the temperature dependence of the main flux 26 within the whole magnetic system can also be influenced within certain limits. This is very advantageous, as the individual portions of the magnetic circuit have magnetic properties subject to a spread, so that a normal or normalized temperature compensation can usually be obtained only with difficulty. The adjustability of the magnetic shunt plate 30 makes possible a normalization of the temperature compensation in a simple manner, independently of any spread of the magnetic properties of the individual parts of the system.

If, in the version according to FIG. 6, the amount of temperature compensation is regulated once and for all by adjustment of the distance of the magnetic shunt plate 30 with respect to the air gap, then the effect of the temperature compensation can be further increased by replacing the magnetic shunt plates 28 and 29 by an auxiliary magnetic shunt segment 33 which, in dependence of temperature, may be moved closer or further away from the air gap 3.

Figure 8:
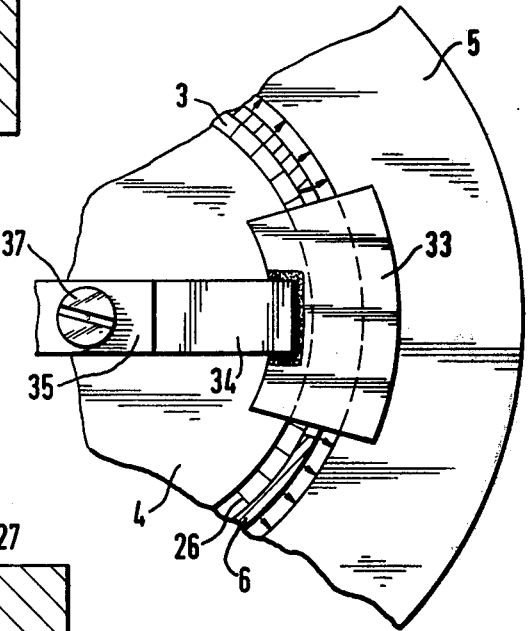
FIG. 8 shows a simplified plan view of the embodiment of the invention shown in FIG. 7.
Figure 7:
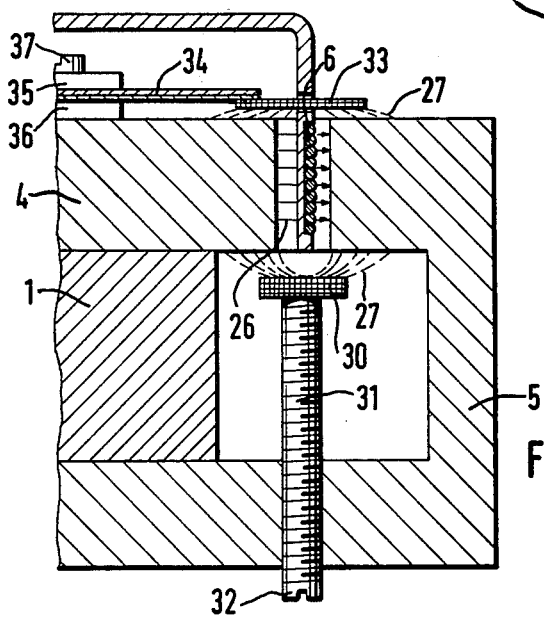

FIGS. 7 and 8 show versions having an auxiliary magnetic shunt segment 33. As can be seen from FIG. 8, the magnetic shunt segment 33 has the form of an annular segment. The radial width exceeds the width of the air gap 3 between the pole plate 4, and the portion of the pot 5 facing the outer rim of the pole plate 4. The magnetic shunt segment 33 thus covers the air gap 3, and is therefore disposed simultaneously above the pole plate 4, and the surface of the pot 5, as can be seen from FIG. 7. To this extent, its effect is comparable with the magnetic shunt plates 28 and 29. It will be further seen, that the magnetic shunt segment 33 passes through the suspending means provided for the coil 6. The magnetic shunt segment 33 is secured to a free end of a bimetallic strip 34, disposed in the same plane as the segment 33, the other end of the bimetallic strip 34 which strip has a shape so as to be controllable as a function of temperature, and is being arranged within the center of the magnetic system between the clamps 35 and 36, the clamps 35 and 36 being held together by a screw 37. The magnetic shunt segment 33 is also composed of a magnetic or magnetizable material having a negative temperature coefficient.

The above version of the invention operates as follows:

The auxiliary or stray flux 27, when parallel with the main flux 26, and serving for temperature compensation, is influenced in a dual fashion. It is firstly influenced by the magnetic reluctance of the magnetic shunt segment 33 increasing as a function of decreasing temperature, and is additionally influenced by the flux 27 being a function of the distance of the magnetic flux segment 33 from the air gap 33. As a result of the suspension of the magnetic shunt segment 33 on the bimetallic strip 34, the distance of the segment 33 from the air gap 3 increases, when the temperature decreases. Thus, the auxiliary or stray flux 27 is further weakened.

As the magnetic reluctance of a magnet or magnetizable material for the auxiliary magnetic shunt element is not linearly dependent on temperature, and since it is furthermore dependent on the magnetic or magnetizable material selected, any change of the magnetic reluctance takes place frequently within a relatively small temperature region, so that a compensation over a large temperature region can also be insured by a plurality of magnetic shunt elements not being composed of the same magnetic or magnetizable material, but of magnetic or magnetizable materials which, as far as the negative temperature coefficient of their respective reluctances is concerned, are similar, but differ in the temperature dependences of their respective reluctances, or magnetic conductivities. Thus, a portion of, or a proportion of the magnetic shunt elements may have a magnetic conductivity which is primarily changeable in a lower portion of the operating temperature region, while another portion of the magnetic shunt elements may have a magnetic conductivity changeable in an upper portion of the operating temperature region. It will be seen clearly, that a suitable mix concerning the number, the arrangement, and the magnetic properties of the materials of the magnetic shunt path elements may lead to a compensation of the temperature variability of the main flux 26 by a temperature-dependent variation of the stray or auxiliary flux 27, which latter maintains the main flux 26 constant within a relatively large temperature region.

Suitable magnetic properties are, for example, soft magnetic materials, such as nickel-iron alloys. By a variation of the composition and heat treatment, it is therefore possible to vary the position of the Curie point, as well as the position and shape of the temperature-induction curve. Particularly in the version according to FIGS. 7 and 8, it is possible to use a ferromagnetic material for the magnetic shunt segment 33, as in view of the operation of the bimetallic strip 34 also in that material selection the auxiliary or stray flux 27 is reduced when the temperature is increase.

I wish it to be understood that I do not desire to be limited to the exact details of construction shown and described, for obvious modifications will occur to a person skilled in the art.

I claim:

1. Electromagnetically compensated weighing apparatus comprising magnetic means for balancing a load member, a compensating coil being connected to said load member, said magnetic means forming a magnetic circuit including an air gap, said compensating coil being disposed in said air gap, a magnetic flux of said magnetic circuit passing through said air gap as well as through said compensating coil and, magnetic shunt means disposed adjacent said air gap at an adjustable distance from said magnetic means, a portion of said magnetic flux passing through said magnetic shunt means and bypassing said compensating coil.

2. An apparatus according to claim 1, wherein said shunt means are composed of materials having respective reluctances of differing temperature dependence.

3. An apparatus according to claim 1, wherein said flux includes a main flux having a predetermined direction, and further comprising adjustable threaded means having an end facing said air gap, insertable into said magnetic means, and movable substantially at right angles to said predetermined direction, said magnetic shunt means being disposed at said end facing said air gap, whereby said magnetic circuit may be adjusted by said threaded means.

4. An apparatus according to claim 3, further comprising bimetallic temperature-sensitive means having a shape controllable as a function of temperature, a first end rigidly secured to said magnetic means, and a second free end, the position of said second free end with respect to said magnetic means being controllable by said bimetallic temperature-sensitive means, said magnetic shunt means being disposed at said second free end of said bimetallic temperature-sensitive means, so as to automatically temperature-compensate said magnetic means.

5. An apparatus according to claim 3, further comprising additional magnetic shunt means, and wherein said additional magnetic shunt means are rigidly secured to said magnetic means near said air gap.

* * * * *